(12) United States Patent
Ro et al.

(10) Patent No.: US 7,597,996 B2
(45) Date of Patent: Oct. 6, 2009

(54) CARTRIDGE-TYPE BATTERY PACK

(75) Inventors: Jong Yul Ro, Seoul (KR); John E. Namgoong, Seoul (KR)

(73) Assignee: LG Chem, Ltd. (KR)

( * ) Notice: Subject to any disclaimer, the term of this patent is extended or adjusted under 35 U.S.C. 154(b) by 760 days.

(21) Appl. No.: 10/965,334

(22) Filed: Oct. 14, 2004

(65) Prior Publication Data

US 2005/0100783 A1    May 12, 2005

(30) Foreign Application Priority Data

Oct. 14, 2003    (KR)    ............... 10-2003-0071282

(51) Int. Cl.
  *H01M 10/04* (2006.01)
  *H01M 10/50* (2006.01)
  *H01M 2/02* (2006.01)
(52) U.S. Cl. .................. 429/159; 429/120; 429/176
(58) Field of Classification Search .......... 429/159, 429/120, 176
  See application file for complete search history.

(56) References Cited

U.S. PATENT DOCUMENTS

| 6,403,251 | B1 | 6/2002 | Baggaley et al. ............ 429/61 |
| 6,531,246 | B2 | 3/2003 | Hanafusa et al. ............ 429/162 |
| 7,291,423 | B2* | 11/2007 | Kajiya et al. ................ 429/160 |
| 2002/0061436 | A1 | 5/2002 | Inagaki et al. .............. 429/120 |
| 2003/0157399 | A1* | 8/2003 | Ikeuchi et al. ............... 429/62 |
| 2006/0051664 | A1* | 3/2006 | Tasai et al. .................. 429/161 |

FOREIGN PATENT DOCUMENTS

| KR | 2004-22236 A | 11/2004 |
| KR | 0296075 Y1 | 11/2004 |

OTHER PUBLICATIONS

International Search Report for Application No. PCT/KR2004/002593; Date of Mailing: Dec. 23, 2004.

* cited by examiner

*Primary Examiner*—Mark Ruthkosky
*Assistant Examiner*—Karie O'Neill
(74) *Attorney, Agent, or Firm*—Cantor Colburn LLP

(57) ABSTRACT

Disclosed is a cartridge-type lithium ion polymer battery pack including: at least two lithium ion polymer batteries in which adjacent electrode tabs are connected to each other so as to form a predetermined series circuit with a desired instrument; and an upper plate and a lower plate disposed at the top and the bottom of the whole lithium ion polymer batteries, respectively, and coupled to each other so that each lithium ion polymer battery is partially covered with them. Multiple layers of the battery packs are laminated and fixed with ease so as to conform to the electric power requirement for a desired instrument.

10 Claims, 5 Drawing Sheets

CARTRIDGE-TYPE BATTERY PACK

TECHNICAL FIELD

The present invention relates to a lithium ion polymer battery pack. More particularly, the present invention relates to a cartridge-type lithium ion polymer battery pack, wherein at least two pouch-shaped lithium ion polymer batteries are fixed with an upper plate and a lower plate so as to be partially covered with the plates, thereby providing a cartridge-type battery pack, and multiple layers of such cartridge-type battery packs are laminated and connected to each other in series so as to conform to the electric power requirement for a desired instrument and then are fixed detachably by means of bolts and nuts, or elastic fasteners.

BACKGROUND ART

In general, as shown in FIG. 1, a battery module 1 includes: a shell 2 having a predetermined housing space that is open at the top and the bottom thereof; a battery assembly 6 having a plurality of cylindrical batteries 3 disposed in such a manner that axis lines of the batteries are parallel to each other, and battery retaining boards 5 disposed at the top and the bottom of the whole batteries 3 so as to fix the batteries 3 integrally by means of support bars 4; a lower cap 7 for fixing the lower battery retaining board 5 of the battery assembly 6 by means of the lower edge of the shell when the battery assembly 6 is inserted into the housing space of the shell 2; and an upper cap 8 for fixing the upper battery retaining board 5 of the battery assembly 6 by means of the upper edge of the shell 2.

Particularly, each of the lower cap 7 and the upper cap 8 is provided with airflow ports 9 in order to discharge heat generated from each battery 3 in the battery assembly 6 to the exterior. Additionally, the upper cap 8 is provided with terminals 8a at one side thereof so as to supply electric current to an external instrument.

However, such a conventional battery module has a problem in that batteries forming a battery assembly have a cylindrical shape and relatively large length and thus the whole volume of the battery module undesirably becomes large.

Further, because the battery assembly is large, it is not handy to laminate and integrally fix a plurality of battery assemblies in order to manufacture a battery module conformed to the electric power requirement for a desired instrument.

In another aspect, such a conventional battery module has a complicated structure because electrodes of each battery in a battery assembly are connected via connectors on the battery retaining boards. Moreover, connecting electrodes of each battery via connectors on the battery retaining boards is very cumbersome work.

Additionally, when multiple battery modules are laminated so as to be applied as a power source for an instrument requiring high output (for example a motor-drivable car), there is a great possibility of batteries being overheated while the battery modules are operated for a long time, because batteries in a battery assembly forming a battery module are in close contact with each other and surrounded with a shell.

DISCLOSURE OF THE INVENTION

Therefore, the present invention has been made in view of the above-mentioned problems. It is an object of the present invention to provide a cartridge-type lithium ion polymer battery pack, wherein a plurality of batteries are disposed in a predetermined unit to provide a cartridge-type lithium ion polymer battery pack and multiple layers of such cartridge-type lithium ion polymer battery packs are laminated so as to conform to the electric power requirement for a desired instrument and then fixed with ease.

It is another object of the present invention to provide a cartridge-type lithium ion polymer battery pack whose voltage and temperature can be measured simply by connecting a desired PCB (printed circuit board) to electrode tabs of lithium ion polymer batteries in the battery pack.

It is still another object of the present invention to provide a cartridge-type lithium ion polymer battery pack which can be used as a power source for an instrument requiring high output such as a motor-drivable car, in the form of multiple layers of battery packs that cause heat generated from the battery packs to be discharged to the exterior efficiently.

According to an aspect of the present invention, there is provided a cartridge-type battery pack including: at least two batteries in which corresponding electrode tabs are connected to each other so as to connect with a desired instrument; and an upper plate and a lower plate disposed at the top and the bottom of the whole lithium ion polymer batteries, respectively, and coupled to each other so that each lithium ion polymer battery is partially covered with them.

According to another aspect of the present invention, there is provided a cartridge-type battery pack includes a battery; and an upper plate and a lower plate disposed at top and bottom of the battery, respectively, and coupled to each other so that the battery is partially covered with them.

Herein, the term "instrument" is to be understood that it includes all of hybrid electric vehicles (HEV), electric vehicles (EV) and various prime movers.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention as shown in FIGS. 2 to 7.

Figure 1:
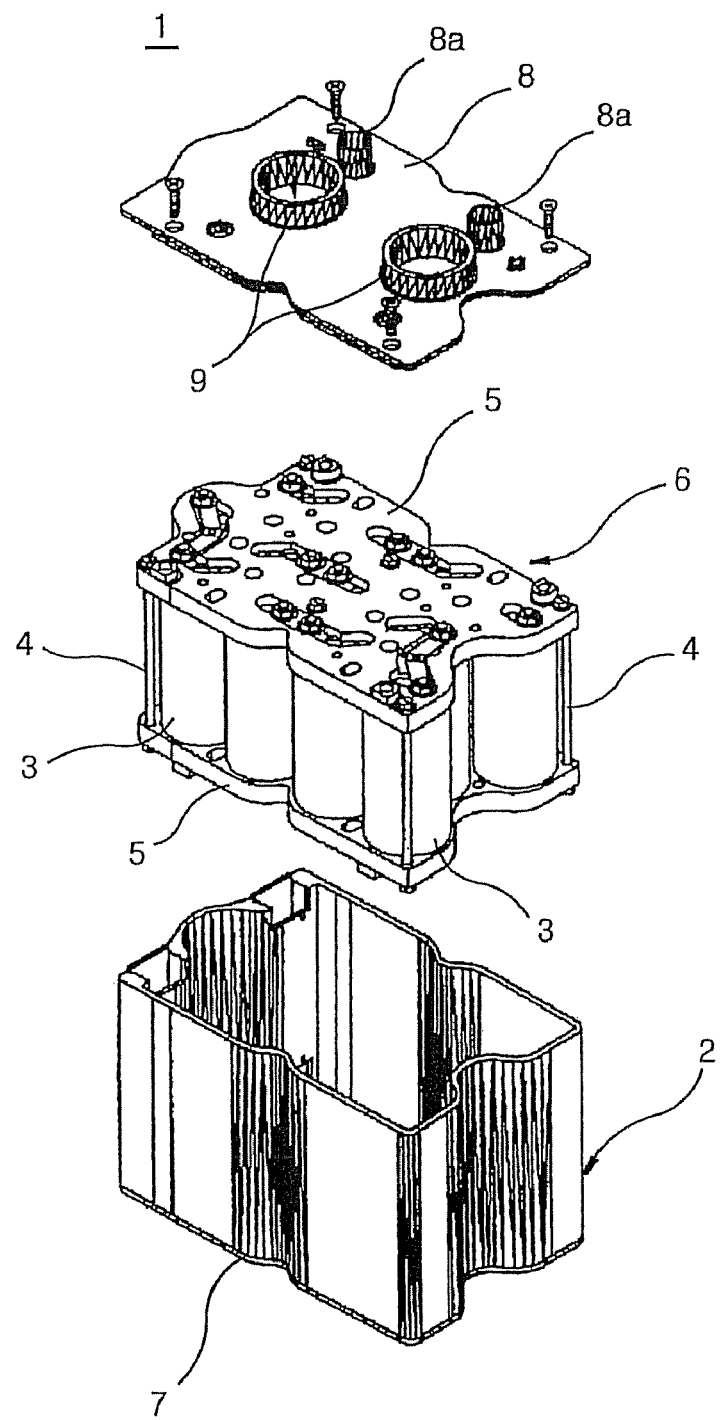
FIG. 1 is a schematic exploded perspective view showing a conventional battery module.
Figure 2:
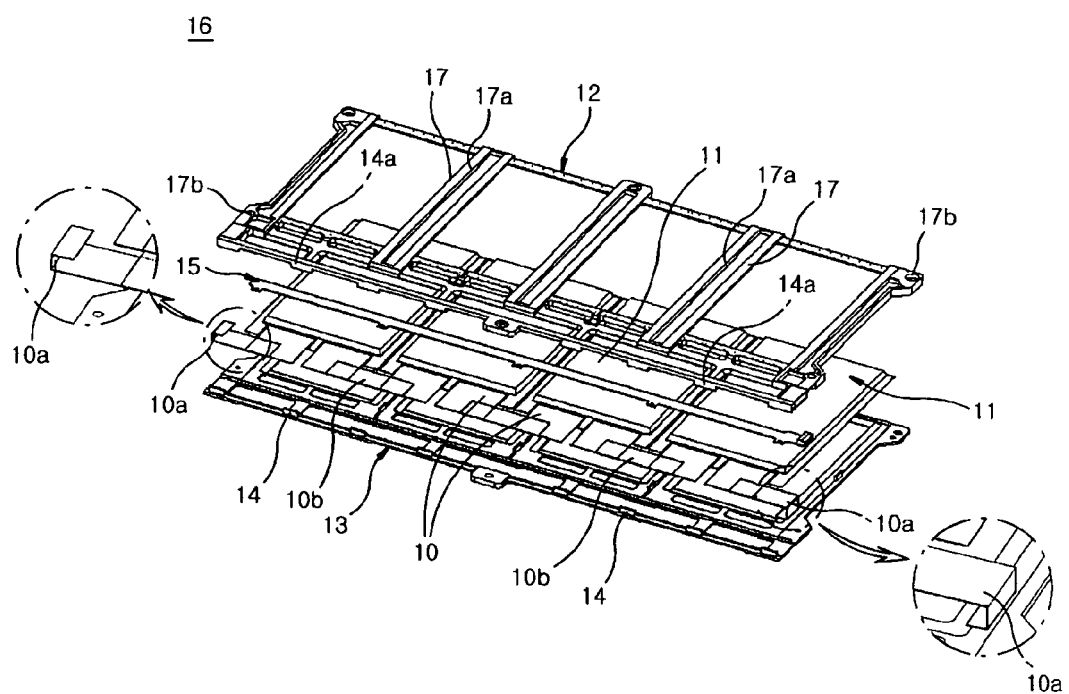
FIG. 2 is a schematic exploded perspective view showing a cartridge-type lithium ion polymer battery pack according to a preferred embodiment of the present invention.
Figure 3:
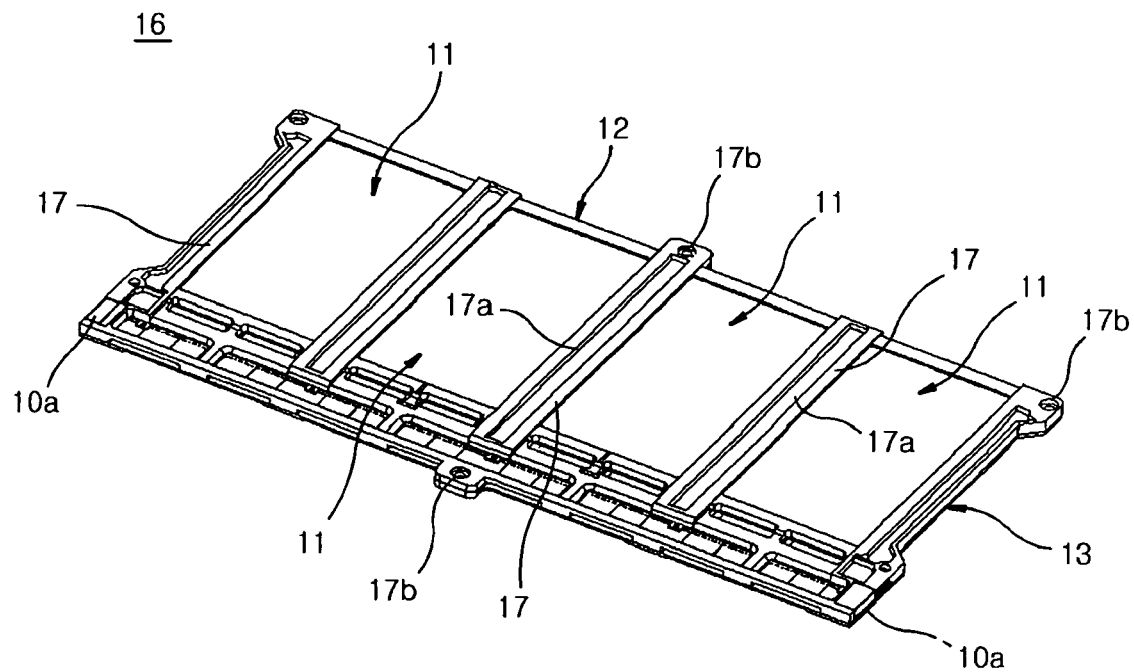
FIG. 3 is a schematic perspective view showing a cartridge-type lithium ion polymer battery pack according to a preferred embodiment of the present invention.

FIG. 2 is a schematic exploded perspective view showing a cartridge-type lithium ion polymer battery pack according to a preferred embodiment of the present invention. FIG. 3 is a schematic perspective view showing a cartridge-type lithium ion polymer battery pack according to a preferred embodiment of the present invention.

As shown in FIGS. 2 to 7, the battery pack according to the present invention includes: at least two lithium ion polymer batteries 11 in which adjacent electrode tabs 10 (or electrode terminals) are connected to each other so as to form a predetermined series circuit with a desired instrument (not shown); and an upper plate 12 and a lower plate 13 disposed at the top and the bottom of the whole lithium ion polymer batteries, respectively, and coupled to each other so that each lithium ion polymer battery 11 is partially covered with them (See FIGS. 2 and 3).

Particularly, each lithium ion polymer battery 11 may be fixed by means of an adhesive coated on the surface facing to each of the upper plate 12 and the lower plate 13. Otherwise, each lithium ion polymer battery 11 may be fixed by a unique shape of each of the upper plate 12 and the lower plate 13.

When the lithium ion polymer battery 11 is fixed by a unique shape of each of the upper plate 12 and lower plate 13, it is preferable that one of the upper plate 12 and the lower plate 13 has a plurality of protrusions 14 for engagement at predetermined intervals and the other has a plurality of holes 14a for engagement corresponding to the protrusions 14.

Preferably, a PCB 15 is disposed between the upper plate 12 and the lower plate 13, wherein the PCB 15 has a predetermined length and is provided with wires each corresponding to a positive (+) pole and a negative (−) pole, each wire being connected to the corresponding electrode tabs 10 of each lithium ion polymer battery 11 so that the voltage and temperature of the battery can be measured.

Two outer electrode tabs 10 of two outermost batteries in the lithium ion polymer batteries 11 may be connected to outer electrode tabs 10 of the outermost batteries disposed at both sides of another adjacent battery pack so as to form a series circuit with the lithium ion polymer batteries in the adjacent battery pack. Such connection can be made by two corresponding conductive pieces 10a, one having an upwardly bent outer end portion and the other having a downwardly bent outer end portion. In this case, remaining electrode tabs adjacent to each other inside of the lithium ion polymer batteries 11 may be connected by means of another plate-like conductive pieces 10b.

Figure 4:
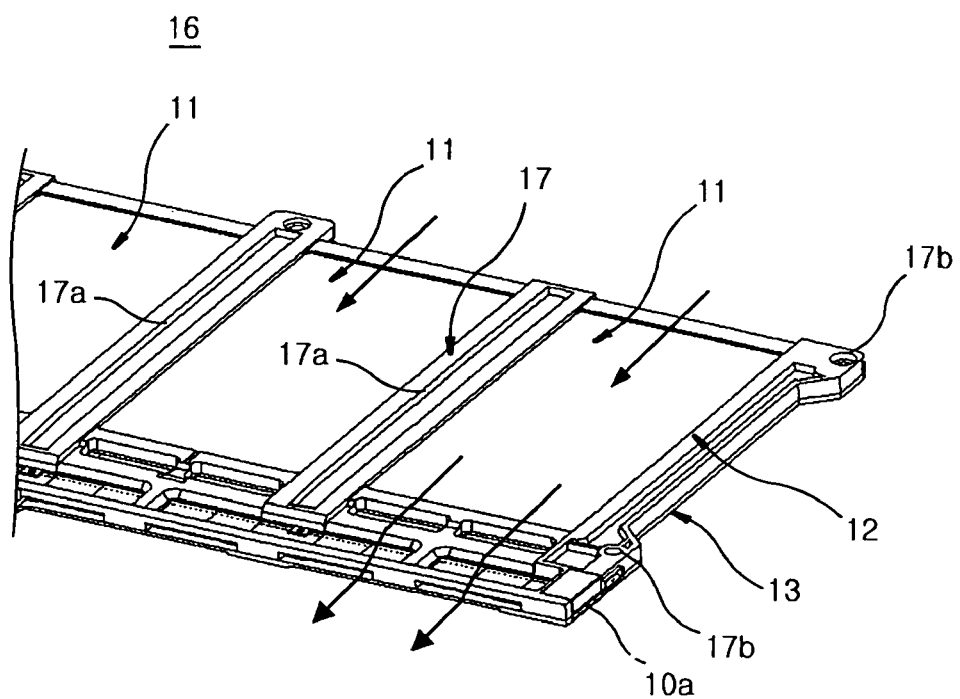
FIG. 4 is a schematic perspective view showing the airflow path for cooling lithium ion polymer batteries in a cartridge-type lithium ion polymer battery pack according to a preferred embodiment of the present invention.
Figure 5:
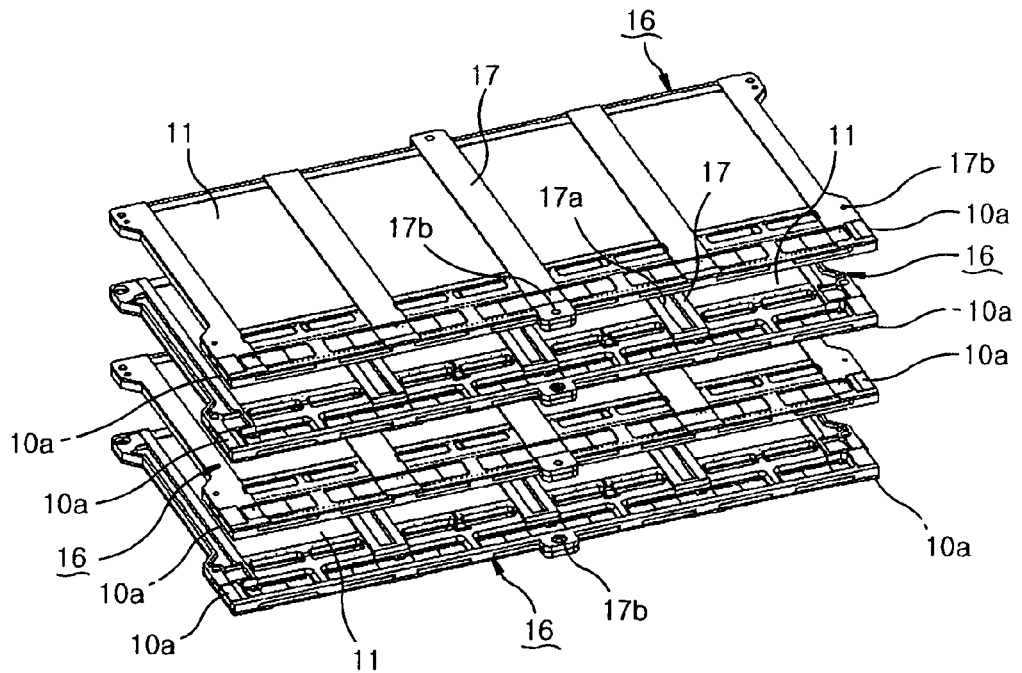
FIG. 5 is a schematic perspective view showing how to laminate multiple layers of cartridge-type lithium ion polymer battery packs according to a preferred embodiment of the present invention.
Figure 6:
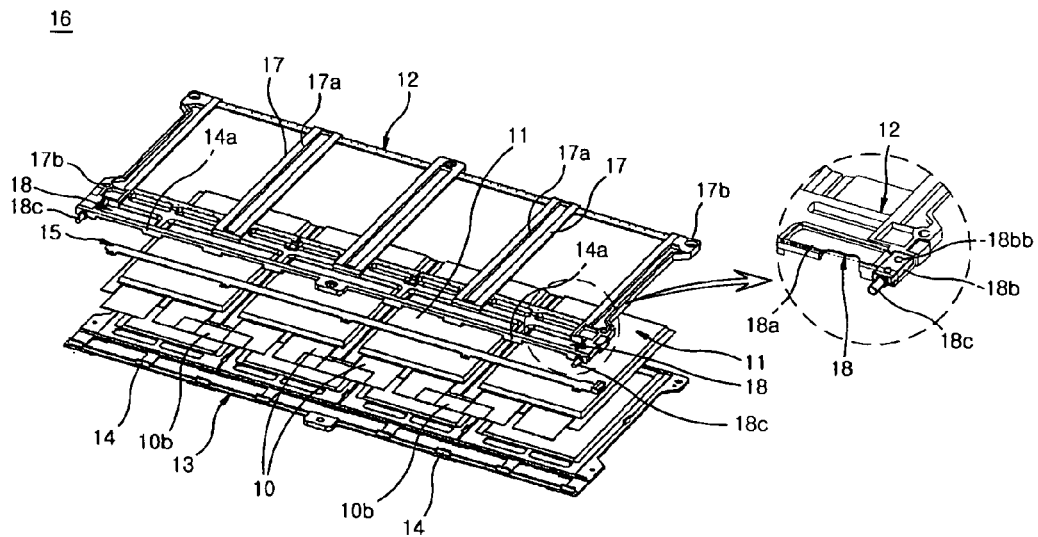
FIG. 6 is a partially enlarged schematic exploded perspective view showing the laminated structure of multiple layers of cartridge-type lithium ion polymer battery packs according to another preferred embodiment of the present invention, wherein two outer terminals between the outermost battery of a first layer of battery pack and that of a second layer of battery pack adjacent to the first layer are connected in series.
Figure 7:
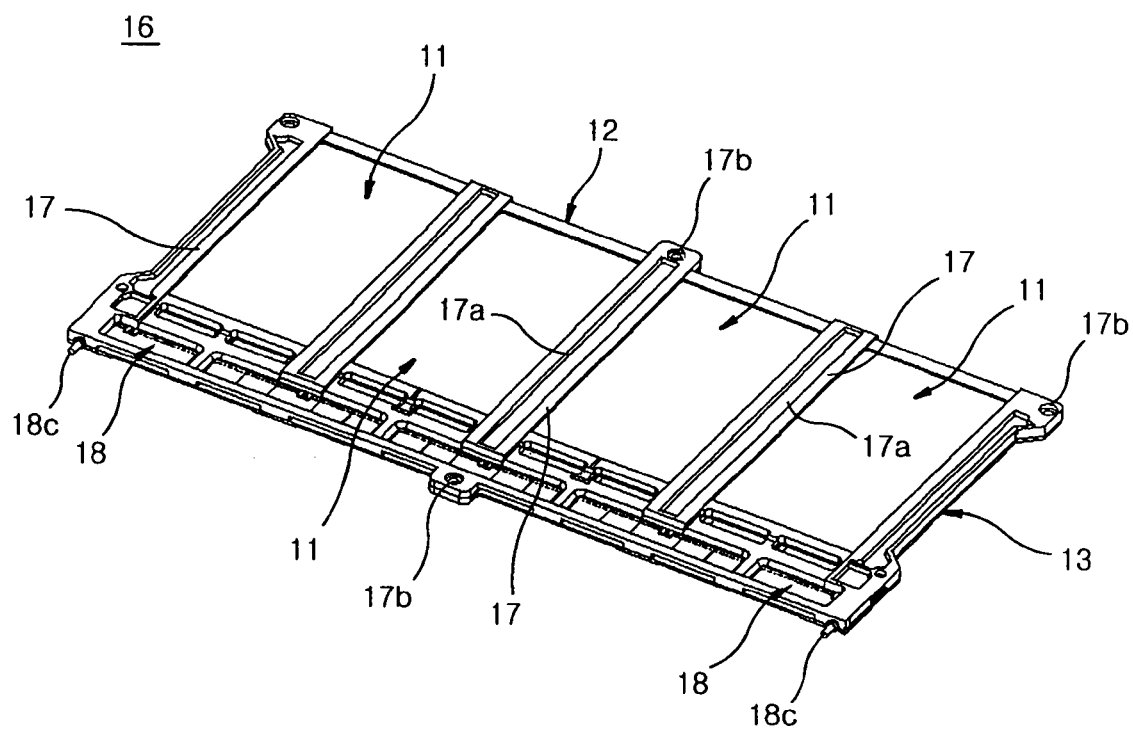
FIG. 7 is a schematic perspective view showing a cartridge-type lithium ion polymer battery pack as shown in FIG. 6.

Additionally, each of the upper plate 12 and the lower plate 13 may be provided with cross members 17 disposed along the length of each plate 12, 13, the cross members 17 being spaced apart from each other by a predetermined distance in the direction of width, so that lithium ion polymer batteries 11 in each battery pack 16 can be partially exposed to the exterior and cooled smoothly by the air when multiple layers of battery packs are laminated (See FIGS. 4 and 5).

In this case, each cross member 17 may be at least partially protruded out from the surface of the lithium ion polymer battery 11 to which it is faced. Additionally, each cross member 17 may be provided with a slit hole or a concave portion 17a having a desired pattern for the purpose of reducing a weight increase resulting from lamination of multiple battery packs 16 and preventing a so-called "sink" phenomenon, i.e., a phenomenon wherein the surface of an injection molded product looks to be dented.

Further, it is preferable that at least a part of the cross members 17 have through-holes 17b at end edges thereof so that at least two battery packs 16 can be integrally fixed by means of bolts and nuts.

In another embodiment, each of the upper plate 12 and the lower plate 13 covering each lithium ion polymer battery 11 may be fixed with a fastener (not shown) such as a clip having a predetermined elastic force.

Meanwhile, in still another embodiment, two outer electrode tabs 10 of two outermost batteries in the lithium ion polymer batteries 11 may be partially insert molded at both outermost ends in any one of the upper plate 12 and the lower plate 13 so as to form a series circuit with lithium ion polymer batteries of another adjacent battery pack. Particularly, two outer electrode tabs 10 of two outermost batteries in the lithium ion polymer batteries 11 may be connected to outer electrode tabs 10 of the outermost batteries disposed at both sides of another adjacent battery pack by means of conductive insert members 18 partially exposed to the exterior and metal members (not shown) that are detachable or fixed by welding in order to interconnect the outer exposed portions of the conductive insert members 18 (See, FIGS. 6 and 7).

In this case, each conductive insert member 18 may include an inner portion 18a to be connected to the outer electrode tab 10 of the corresponding battery when they are assembled, a fixing portion 18b having at least one fill-in hole 18bb in which molten resin is filled during insert molding, the fixing portion 18b being formed integrally with the inner portion 18a, and a protrusion 18c extending out from the fixing portion 18b and connected to the metal member.

Hereinafter, the assembling process and operation of the above-described cartridge-type lithium ion polymer battery pack according to present invention will be explained (See FIGS. 2 to 5).

First, a predetermined number of lithium ion polymer batteries are disposed on a worktable (not shown). Then, electrode tabs 10 adjacent to each other in each lithium ion polymer battery 11 are connected by means of conductive pieces 10a, 10b sequentially.

Particularly, two outer electrode tabs 10 of the outermost batteries disposed at both sides of the lithium ion polymer batteries 11 are connected to outer electrode tabs 10 of the outermost batteries disposed at both sides of another adjacent battery pack by means of two corresponding conductive pieces 10a, respectively.

Next, the upper plate 12 is disposed at one side of the whole lithium ion polymer batteries 11, the lower plate 13 being disposed at the other side thereof. The upper and lower plates 12, 13 are fixed with an adhesive applied along the surface facing to them. Otherwise, the upper and lower plates 12, 13 are fixed by means of protrusions 14 and holes 14a for engagement (See FIGS. 2 and 3).

Meanwhile, for the purpose of measuring the voltage and temperature of the lithium ion polymer batteries 11 with ease, a PCB 15 is disposed on the top of the whole lithium ion polymer batteries 11 so that it may be in contact with the electrode tabs 10 of each lithium ion polymer battery or with the corresponding conductive piece 10a, 10b. Then, the lithium ion polymer batteries 11 may be fixed with the upper and lower plates 12, 13.

Next, once a battery pack 16 including a unit having a plurality of lithium ion polymer batteries 11 is completely assembled, multiple layers of battery packs 16 may be laminated to the number conformed to the electric power requirement of a desired instrument (not shown). Next, such laminated battery packs may be fixed by inserting bolts through the through holes 17b formed at the end edge of the cross members 17 in the upper and lower plates 12, 13 and securing the bolts with nuts. Otherwise, such laminated battery packs 16 may be fixed by using elastic fasteners.

Particularly, both conductive pieces 10a disposed at the outermost electrode tabs 10 of the lithium ion polymer batteries 11 disposed at the outermost sides of the battery pack 16 are fitted to wrap the edge of the corresponding plate 12 or 13, one conductive piece being bent upwardly and the other being bent downwardly. Therefore, the upwardly bent conductive piece 10a is connected to the electrode tab (or electrode terminal) of the outermost lithium ion polymer battery 11 of the counterpart battery pack disposed on the top of the upwardly bent conductive piece 10a. Similarly, the downwardly bent conductive piece 10a is connected to the electrode tab of the outermost lithium ion polymer battery 11 of the counterpart battery pack disposed on the bottom of the downwardly bent conductive piece 10a (See FIG. 5).

Meanwhile, when multiple battery packs are laminated for use as a power source for instruments such as motor-drivable cars, a physical space is formed between one battery pack and another battery pack adjacent thereto by the cross members 17 formed at the outer sides of the upper and lower plates 12, 13 of each battery pack 16. Accordingly, lithium ion polymer batteries 11 surrounded by adjacent battery packs may be cooled smoothly by the air circulated through the space formed between the corresponding battery pack and another battery pack adjacent thereto (See FIGS. 4 and 5).

INDUSTRIAL APPLICABILITY

As can be seen from the foregoing, according to the present invention, multiple layers of the battery packs are laminated and fixed with ease so as to conform to the electric power requirement for a desired instrument.

Additionally, according to the present invention, it is possible to measure the voltage and temperature of a battery pack simply by means of a PCB connected to the electrode tabs of each lithium ion polymer battery in the battery pack.

Further, when multiple layers of battery packs are used as a power source for an instrument requiring high output such as a motor-drivable car, it is possible to discharge heat generated from the battery packs to the exterior efficiently.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A cartridge-type battery pack comprising:
at least two batteries in which corresponding electrode tabs are connected to each other so as to connect with a desired instrument, and
an upper plate and a lower plate disposed at top and bottom of the whole batteries, respectively, and coupled to each other so that each battery is partially covered with them;
wherein each of the upper plate and the lower plate is provided with cross members disposed along the length of each plate, the cross members being spaced apart from each other by a predetermined distance in the direction of width, so that the batteries in each battery pack are partially exposed to the exterior for cooling, and at least a part of the cross members have throughholes at end edges thereof and at least two battery packs can be integrally fixed by bolts and nuts via the throughholes.

2. The cartridge-type battery pack according to claim 1, wherein one of the upper plate and the lower plate has a plurality of protrusions for engagement at predetermined intervals and the other has a plurality of holes for engagement corresponding to the protrusions.

3. The cartridge-type battery pack according to claim 1, wherein a printed circuit board (PCB) having a predetermined length is disposed between the upper plate and the lower plate, and the PCB is provided with wires each corresponding to a positive (+) pole and a negative (−) pole, each wire being connected to the corresponding electrode tab of each battery, so that voltage and temperature of the battery can be measured.

4. The cartridge-type battery pack according to claim 1, wherein two outer electrode tabs of two outermost batteries among the batteries are connected to outer electrode tabs of the outermost batteries disposed at both sides of another adjacent battery pack so as to form a series circuit with the batteries in the adjacent battery pack, such connection being made by two corresponding conductive pieces, one having an upwardly bent outer end portion and the other having a downwardly bent outer end portion.

5. The cartridge-type battery pack according to claim 1, wherein each cross member is at least partially protruded out from the surface of the battery to which it is faced, so that the batteries in each battery pack can be cooled smoothly by the air.

6. The cartridge-type battery pack according to claim 1, wherein two outer electrode tabs of two outermost batteries among the batteries are partially insert molded at both outermost ends in any one of the upper plate and the lower plate so as to form a series circuit with the batteries of another adjacent battery pack, the two outer electrode tabs being connected to the outer electrode tabs of the outermost batteries disposed at both sides of another adjacent battery pack by means of conductive insert members partially exposed to the exterior and metal members interconnecting the outer exposed portions of the conductive insert members.

7. The cartridge-type battery pack according to claim 6, wherein each conductive insert member includes an inner portion to be connected to the outer electrode tab of the corresponding battery when they are assembled, a fixing portion formed integrally with the inner portion and filled in with molten resin during insert molding, and a protrusion extending out from the fixing portion and connected to the metal member.

8. The cartridge-type battery pack according to claim 7, wherein the fixing portion of each conductive insert member has at least one fill-in hole in which molten resin is filled during insert molding.

9. The cartridge-type battery pack according to claim 1, wherein the electrode tabs of inner batteries among the batteries are connected to the corresponding electrode tabs of adjacent batteries by means of conductive pieces.

10. The cartridge-type battery pack according to claim 1, wherein the battery is a lithium ion polymer battery.

* * * * *